United States Patent
Busch

(10) Patent No.: US 6,295,876 B1
(45) Date of Patent: Oct. 2, 2001

(54) LINEARITY ADJUSTMENT FEATURE FOR SUSPENDED MOVEMENT-TYPE PRESSURE GAUGES

(75) Inventor: David Arthur Busch, Berea, KY (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 09/412,414

(22) Filed: Oct. 5, 1999

(51) Int. Cl.$^7$ .............................. G01L 19/02; G01L 7/14
(52) U.S. Cl. .................................................. 73/740
(58) Field of Search ........................... 73/740, 711, 712, 73/732, 733, 734, 735, 736, 737, 738, 739

(56) References Cited

U.S. PATENT DOCUMENTS

| | | |
|---|---|---|
| 4,055,085 | 10/1977 | Wetterhorn . |
| 4,246,796 | 1/1981 | Wetterhorn . |
| 4,444,057 | 4/1984 | Wetterhorn . |

*Primary Examiner*—William Oen
(74) *Attorney, Agent, or Firm*—Jenkens & Gilchrist, P.C.

(57) ABSTRACT

In a pressure gauge containing a suspended movement, apparatus for effecting post assembly linearity adjustment of the gauge by displacing the underend of an elongated actuator pin rectilinearily parallel to the axis of the inlet socket on which the pin is firmly but not securely held. Located opposite the under end of the actuator pin is a lateral recess defined in the sidewall of the socket and into which a hand tool can be inserted for gripping and effecting a leveraged displacement of the pin.

7 Claims, 3 Drawing Sheets

US 6,295,876 B1

LINEARITY ADJUSTMENT FEATURE FOR SUSPENDED MOVEMENT-TYPE PRESSURE GAUGES

FIELD OF THE INVENTION

The field of art to which the invention relates comprises post-assembly linearity adjustment for pressure gauges having a spring suspended movement.

BACKGROUND OF THE INVENTION

Pressure gauges of the type having the combination of a Bourdon tube and a spring suspended movement commonly provide for span adjustment that establishes accurate beginning and end points over the pressure range of the indicia scale. Otherwise, such gauges are generally deficient in not providing for linearity adjustment along the intermediate points between the ends.

National standard ASME B-40.1 establishes the standard of accuracy by which the suspended movement type gauges can qualify for "grade A" or closer accuracy. In accordance therewith, pointer rotation is required to be closely tailored to conform with the placement of increments shown on the dial face. Prior attempts toward linearizing have required special, costly, and impractical design changes of the segment gear. Further, any adjustment could only be effected with some degree of disassembly as with the case removed, rendering it necessary to conduct a final inspection for accuracy after complete re-assembly of all gauge components. Such added operations have heretofore made linearity adjustment impractical from a product cost standpoint.

DESCRIPTION OF THE PRIOR ART

Commercial forms of pressure gauges of the spring suspended movement type are disclosed, for example, in U.S. Pat. Nos. at 4,055,085; 4,246,796 and 4,444,057 each incorporated herein by reference. The spring suspended movement or amplifier thereof is mounted onto the free end of a Bourdon tube for floating conjoint movement therewith. A remotely connected link wire actuator extends into the motion path to define a pivot axis for a hinged gear sector arm of the amplifier. In pivoting about the actuator axis, the sector arm operably drives a rotatable output shaft supporting a pointer or the like opposite a graduated dial face. In a typical construction, a superficial form of linearity of the instrument is preset during manufacture. This has consisted generally of presetting the height of the amplifier above the stem to match generally the operating characteristics of the Bourdon tube without regard to variations in operating characteristics as may be contributed elsewhere. This has been effected by vertical positioning of the actuator link to a desired but arbitary height prior to the link being securely staked to the stem.

The foregoing however, has contributed to gross inaccuracies in linearity since the gauge does not become operable for calibration until after staking of the link wire. Once staking has been completed, it has not been readily possible heretofore to alter the predisposed relationship that might contribute to operationally enhanced linearity.

Despite recognition of the foregoing, a ready solution therefore has not heretofore been known.

OBJECTS OF THE INVENTION

It is therefore an object of the invention to provide a novel pressure gauge having a suspended movement readily capable of post assembly calibration for linearity.

It is a further object of the invention to effect the previous object by allowing for post assembly link displacement defining the pivot axis of the suspended movement.

It is a still further object of the invention to effect the previous objects by low cost features enabling linearity settings over the operational span of the pressure gauge.

SUMMARY OF THE INVENTION

This invention relates to pressure gauges of the type having a suspended movement. More specifically, the invention relates to such a pressure gauge in which the suspended movement is capable of post operational calibration for linearity so as to enhance indicia accuracy of the gauge readout.

In accordance with the invention, the gauge is of a suspended movement type as exemplified by the disclosure of U.S. Pat. No. 4,246,796 mentioned supra. The gauge is comprised of a Bourdon tube that internally communicates with an inlet socket extending outward of the gauge case or housing and into which fluid to be pressure monitored is received. The suspended movement is secured to the free end of the Bourdon tube and includes a sector arm pivotally supported by the distal end of an elongated link. Unlike the prior art in which the link is staked securely in place during initially assembly, the link hereof is only secured more casually in place with a controlled resistance that enables external post-assembly displacement of the link. Normal calibration is first performed using the equipment, and procedure recommended in the American National Standard ASME B40.1 section 6. Data collected during this procedure will indicate the amount of linearity adjustment required in order to improve the accuracy grade of the gauge being tested. By then displacing the link appropriately as necessary, changes in the linearity of pointer indication is achieved accurately in response to pressure input. The result is to effect enhanced linear accuracy of the gauge readout thereafter.

Enabling such linearity adjustment is a lateral recess in the gauge stem located about the under end of the link. While using a commercially available calibrator mechanism, linearity adjustment is effected by using a small pliers or other suitable hand tool having its nose extending inward of the recess to grip the under end of the link. This affords leverage for the tool so that the link can be displaced rectilinearly parallel to the stem axis until optimum linearity is achieved. The effect of displacing the link in this manner is to alter the location of the axis about which the sector arm of the movement is pivoted so as to cause enhanced linear accuracy over the operational range of the instrument to be achieved. Thereafter the link can be more firmly secured if desired.

As a consequence of the foregoing, a simple, yet effective structural feature enables not only enhanced accuracy of the gauge per se but at the same time enables compliance with the National Standard ASME B 40.1 for effecting a product upgrade in the marketplace.

The above noted features and advantages of the invention as well as other superior aspects thereof will be further appreciated by those skilled in the art upon reading the detailed description that follows in conjunction with the drawings.

DESCRIPTION OF THE PREFERRED EMBODIMENT

Figure 1:
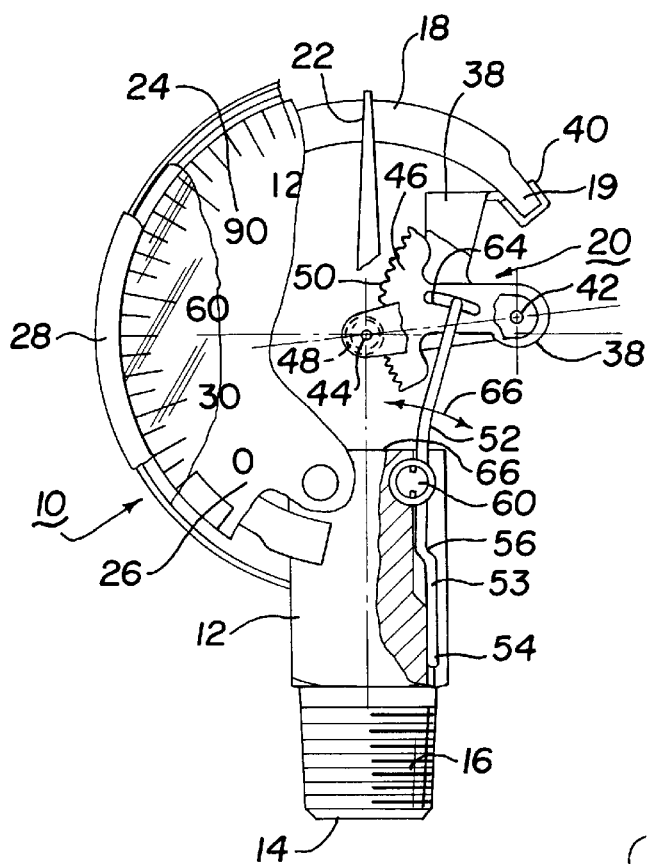
FIGS. 1 & 2 are fragmentary front and end elevations respectively of a prior art pressure gauge in which a suspended movement is utilized.

In the description which follows, like parts are marked throughout the specification and drawings with the same reference numerals respectively. The drawing figures are not necessarily to scale and in certain views, parts may have been exaggerated for purpose of clarity.

Figure 2:
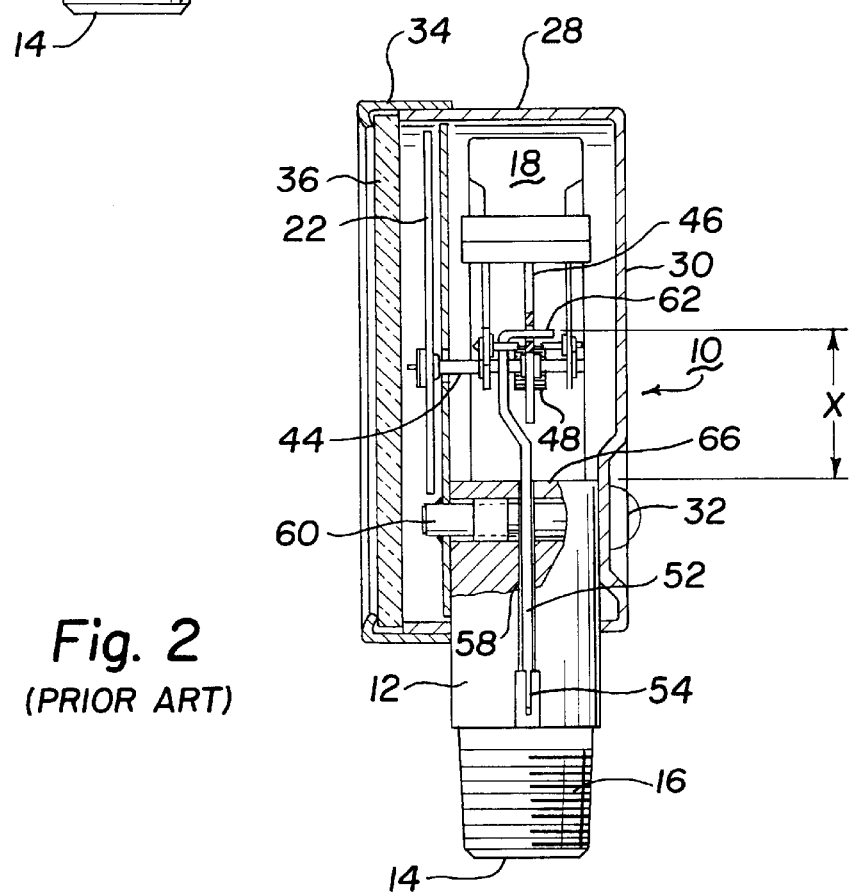
Figure 3:
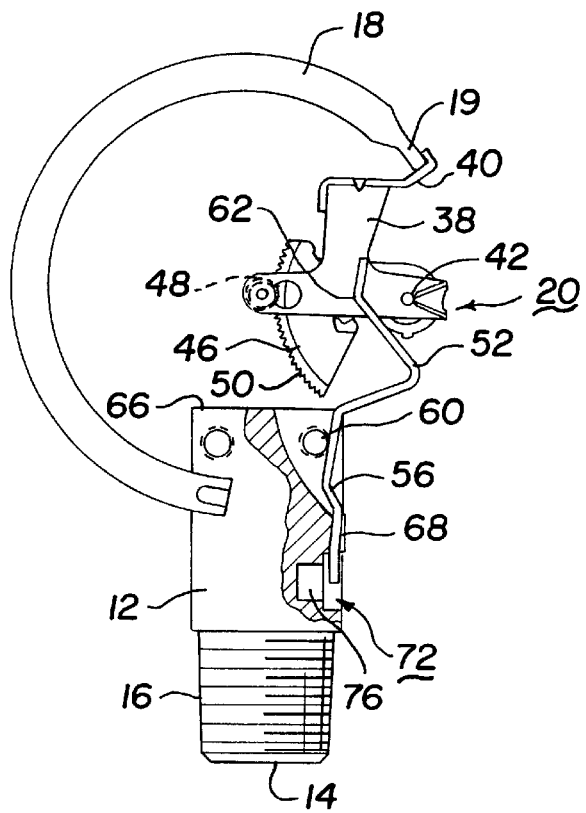
FIGS. 3 & 4 are fragmentary front and end elevations respectively disclosing the structural modifications for effecting post assembly calibration in accordance with the invention.

Referring now to the FIGS. 1 & 2 of the drawings, there is illustrated a suspended movement gauge construction of a type previously disclosed in U.S. Pat. No. 4,246,796. The pressure gauge designated 10, includes a stem or socket 12 in which fluid pressure to be sensed is received at an inlet 14 that includes threads 16 for connecting the gauge to a system with which it is to be utilized. Fluid pressure received at inlet 14 is communicated to a Bourdon tube 18 having a free end 19 that is subject to arcuate motion displacement in a well known manner in response to incremental pressure changes received at inlet 14. The motion of tube end 19 is conducted to amplifier 20 to produce a correlated but amplified output motion for operating a pointer 22 relative to pressure values 24 on dial face 26. Except for stem 12, each of the foregoing components comprise the operating mechanism of the gauge that is substantially contained within an enclosed housing 28. The housing consists of a cup shaped shell-like backing 30 secured via screws 32 to stem 12. A bezel 34 is telescopically fit onto backing 30 and secures transparent crystal 36 thereat for viewing the pointer position relative to dial face 26.

Amplifier 20 is comprised of a central upright U-shaped carriage or frame 38 secured via a U-shaped bracket 40 mounted on displacement end 19 of Bourdon tube 18 as by welding, soldering, brazing, or the like. Being secured in this arrangement, the carriage and components that it supports are subject to a floating movement conjointly with displacement deflection of tube end 19 as a result of pressure changes received at inlet 14.

Mounted in frame 38 are a pair of longitudinally displaceable rotatable shafts 42 and 44, the former of which provides hinge support for a geared sector arm 46 while the latter constitutes the output drive shaft 44 for operating pointer 22. Rotation of shaft 44 is effected by a pinion 48 secured thereto and meshing with sector gearing 50 of arm 46.

Figure 4:
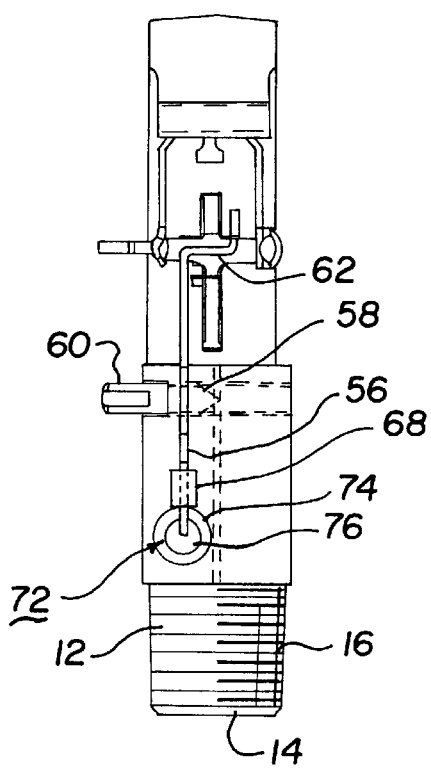

To enable amplifier operation, there is provided an actuator in the form of an elongated relatively rigid metal spring wire or link 52 which at one end extends into a stem recess 53 where it is securely staked to the stem at 54. Just above an offset 56 in actuator wire 52, the actuator engages a conical nose 58 (FIG. 4) of adjustable set screw 60 threadedly received in stem 12. Vertically above that location, the actuator extends to an offset or crank bend 62 positioned within an elongated slot 64 of sector arm 46 for defining the pivot axis therefor. Being that the actuator 52 is bent in spring-like engagement against the nose of screw 50, span adjustment in the direction of arrow 66 can be readily effected.

Figure 6A:
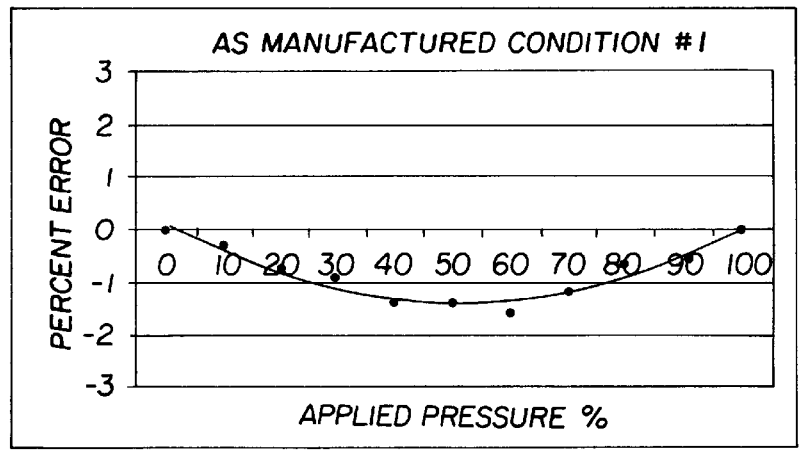
FIGS. 6(A) & 6(B) are graphical illustrations exemplifying linearity performance of a pressure gauge "as manufactured" in accordance with the prior art.
Figure 6B:
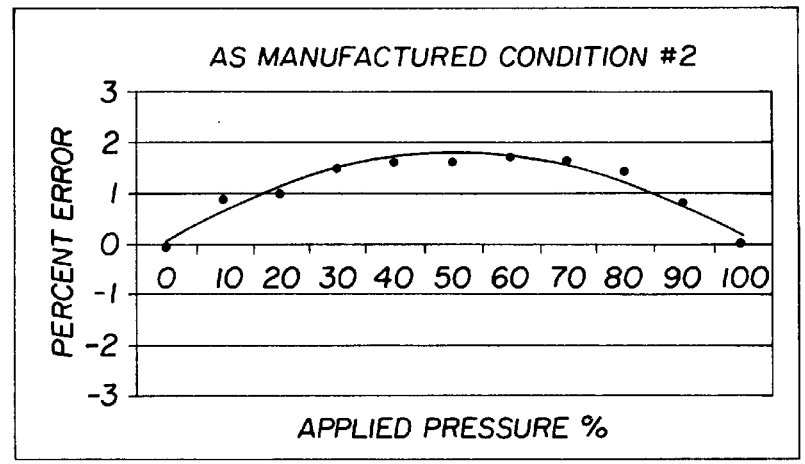
Figure 6C:
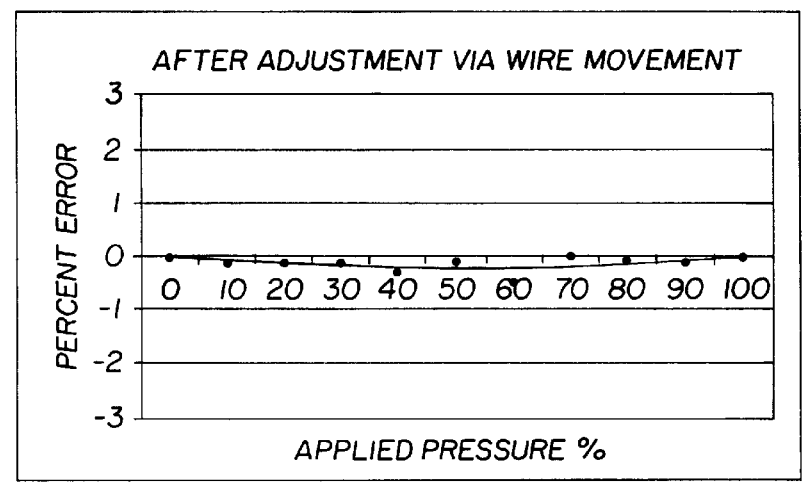
FIG. 6(C) is a graphical illustration exemplifying linearity performance of a pressure gauge after being calibrated in the manner hereof.

In the foregoing arrangement, the entire amplifier 20 is supported in a spring suspension by virtue of Bourdon tube end 40 constituting one spring connection with the amplifier and the actuator link 52 constituting another spring connection with the amplifier. It will be appreciated that the entire construction thus far described including staking 54 and presetting of linearity are incurred during the normal course of manufacturing. Subsequent operational linearity can thereafter be subject to variations as a result of characteristic variations in the individual components that operationally contribute thereto. Typical linearity performance following manufacture are shown, for example, in FIGS. 6(A) and 6(B) for "as manufactured" conditions in which dimension "X" between the bend 62 from the top 66 of socket 12 is 0.540 inches and 0.504 inches respectively.

The improvement for readily effecting linearity adjustment in accordance herewith can be best understood with reference to FIGS. 3–5 and 6(C) enabling post assembly adjustment when set in combination with a gauge calibrator (as described supra). To enable adjustment in the manner hereof a lower portion of the link wire is received in a brass socket material 68 in which the wire is controllably staked to a controlled resistance effected by increasing or decreasing the force applied to the sting punch. This affords the link wire with less than a securely fixed grip rendering the wire displaceable rectilinearly therein.

For these purposes, the lower end of wire 52 extends into a recessed detent or access port 72 in the side wall of stem 12. Comprising the access port is a relatively large circular opening 74 communicating coaxially inward with a relatively smaller circular opening 76 so as to define counterbore shoulders thereat.

Figure 5:
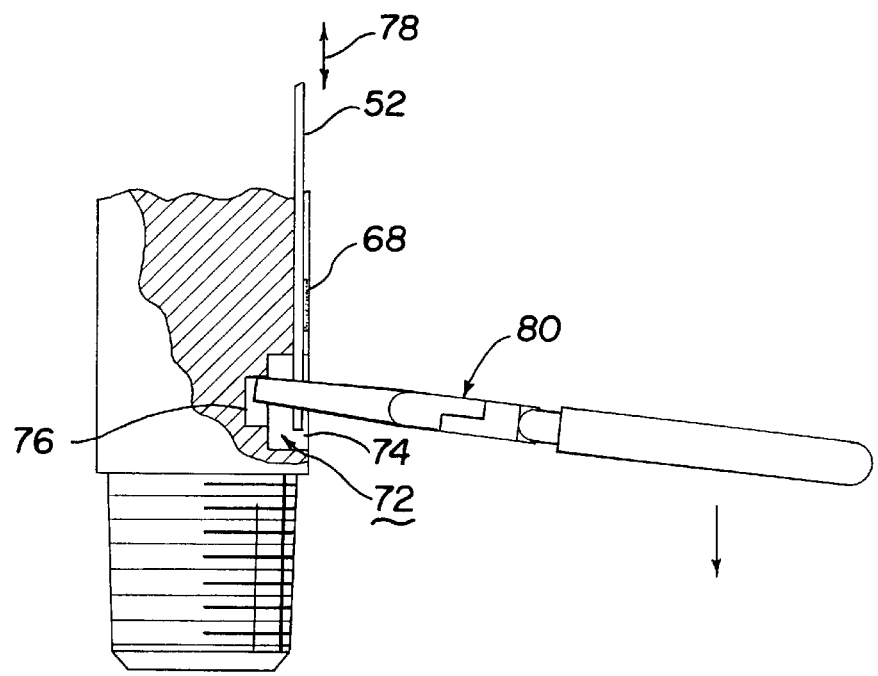
FIG. 5 is a fragmentary enlargement of the encircled portion of FIG. 3 demonstrating the manner in which post assembly calibration of the gauge is effected for linearity.

To calibrate for linearity, the amount of resistance by which wire 52 is held within the brass socket material 68, is controlled as noted supra. Consequently, in a post assembly mode and without case 28 being removed, link wire 52 can be displaced up or down as represented by arrows 78 (FIG. 5). Displacement of the link wire is best effected utilizing a hand tool such as a common side cutter 80 with its nose 82 extending within counterbore opening 76 while gripping wire 52. This affords hand leverage in displacing wire 52 in the direction of arrows 78 as required. Since displacement is performed in combination with a calibrator, the existing gauge components with whatever performance characteristics they contain, are moved relative to one another in order to effect a change in the starting angle of segment arm 46 as will optimize linearity settings.

The significance of the foregoing can be appreciated in its simplification and the fact that it can be conducted entirely external of the gauge as a post assembly procedure. By merely providing an access port or detent permitting insertion and application of a hand tool able to grip and slide the link wire up or down, adjustment can be effected with minimal effort in a minimal amount of time. The result is a linearity adjustment that alters the segment gear starting angle by merely raising or lowering the link as required of each individual gauge assembly.

By the above description, there is disclosed a novel construction for effecting linearity adjustment of a suspended movement-type pressure gauge in an economical and feasible manner. Being simple but requiring a minimum of components enables this feature to be readily performed at minimum cost while enabling the virtues of increased gauge accuracy to be realized.

Since many changes could be made in the above construction and many apparently widely different embodiments of this invention could be made without departing from the scope thereof it is intended that all matter contained in the drawings and specification shall be interpreted as illustrative and not in a limiting sense.

I claim:

1. In a pressure gauge having a suspended movement including a Bourdon tube in which to receive fluid of which the pressure is to be monitored, an amplifier operationally secured to the output of said Bourdon tube, a cross pin defining an axis for effecting pivotal operation of said amplifier in response to changes in fluid pressure being received, and indicia operated by said amplifier for indicating pressure values of the received fluid, an improvement for effecting linearity calibration of said gauge comprising:

a support for holding said cross pin partially secured so as to afford a predetermined resistance to rectilinear displacement; and access means to enable displacement of said cross pin on said support to effect linearity calibration of said indicia indicator.

2. In a pressure gauge in accordance claim 1 in which said pressure gauge includes an external socket from which received fluid to be monitored is communicated to said Bourdon tube, said cross pin comprises an offset portion of an elongated pin, and said support operatively holds a portion of said elongated pin that extends from said offset portion to a distal end beyond said support at which displacement thereof can be urged from said access means.

3. In a pressure gauge in accordance with claim 2 in which said gauge includes a housing for enclosing said suspended movement, said external socket extends outward and exposed beyond said housing and the distal end of said elongated pin is located on said socket at a location outward of said housing.

4. In a pressure gauge in accordance with claim 3 in which there is included a lateral recess defined in a sidewall of said socket opposite the distal end of said elongated pin, said recess being adapted to receive a hand tool for effecting a grip of the elongated pin thereat and for displacing said pin rectilinearily in a parallel relation to the axis of said socket.

5. In a pressure gauge in accordance with claim 4 in which said lateral recess is capable of receiving a nose end of the hand tool for manually enabling leveraged displacement of said pin.

6. In a pressure gauge in accordance with claim 5 in which said lateral recess comprises a pair of coaxial bores providing a surface against which the end nose of a hand tool can be leveraged in displacing said pin.

7. In a pressure gauge in accordance with claim 1 in which said support effectively holds said cross pin by staking at a controlled predetermined resistance to displacement.

* * * * *